No. 682,015. Patented Sept. 3, 1901.
J. P. H. ADAMS.
MUSICAL NOTATION.
(Application filed Apr. 15, 1901.)

(No Model.)

Witnesses
C. E. Hunt.
J. Albertson

Inventor
J. P. H. Adams
By H. B. Willson & Co.
Attorneys

UNITED STATES PATENT OFFICE.

JOHANN PETER H. ADAMS, OF ST. PAUL, MINNESOTA.

MUSICAL NOTATION.

SPECIFICATION forming part of Letters Patent No. 682,015, dated September 3, 1901.

Application filed April 15, 1901. Serial No. 55,887. (No model.)

*To all whom it may concern:*

Be it known that I, JOHANN PETER H. ADAMS, a subject of the Emperor of Germany, residing at St. Paul, in the county of Ramsey and State of Minnesota, have invented certain new and useful Improvements in Systems of Musical Notation; and I do declare the following to be a full, clear, and exact description of the invention, such as will enable others skilled in the art to which it appertains to make and use the same.

My invention relates to a novel and improved system of musical notation, its object being to provide an improved system of notation wherein the notes of the musical scale are exemplified in a more simple manner and adapted to be more easily read than in the system of musical notation now in common use. To this end it consists in the features and arrangement of elements hereinafter more fully described, and particularly pointed out in the appended claim.

Figure 1:
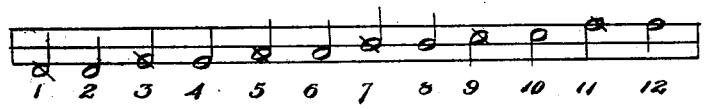
Figure 2:
Figure 3:
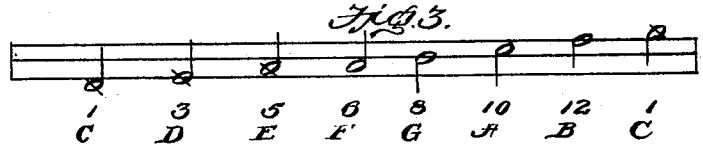
Figure 4:
Figure 5:
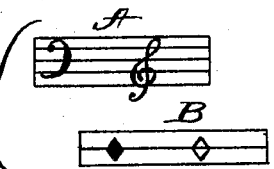

In the accompanying drawings, Figure 1 is a view showing the manner in which the twelve tones used in music are represented in my improved system. Figs. 2 and 3 are views representing the manner in which the scale of C major is represented, respectively, in the old system and my improved system.
Fig. 4 is a view showing the manner in which the scales of G-flat major and F-sharp major are represented in my improved system of notation. Fig. 5 represents two views showing the clef signs of the old and new notations.
Fig. 6 is a view showing the difference in arrangement of the same notes in the system of notation now in use and in my improved system of notation, and Fig. 7 shows two views indicating how the tone-steps are represented in my improved system.

The twelve tones used in music are represented in my improved system by the signs and named according to their numbers, as represented by the numerals "1" to "12," inclusive, in Fig. 1. The scale of C major represented in the present system of notation is represented by the signs and names shown in Fig. 2. Fig. 3 shows the manner in which said scale is represented according to my improved system, in which the notes are represented by the corresponding signs and names shown at the foot of said figure. The scales of G-flat major and F-sharp major of the old system are represented in my improved system by the signs and names shown in Fig. 4.

When tones are used in a piece of music which extend above and below the three lines shown in the illustrations of my system, short lines arranged above and below the lines of the staff are used, as shown in Fig. 4, in the same manner in which they are employed in the present system of notation. All the remaining signs, as half, whole, quarter notes, and rests, remain as in the present system of notation, except that in my improved system the base and treble clef marks (represented by A in Fig. 5) are dispensed with and in their place are used the two tone-location marks, (designated by the letter B in Fig. 5.) These two tone-location marks designate the twelve tones which are called in the old notation "little octave" and "one-dashed octave." The black tone-location mark designates the tones of the little octave, and the white tone-location mark designates the tones of the one-dashed octave. The next twelve tones higher are designated by the first white tone-location mark ; the next twelve tones by the second white tone-location mark . In the same manner are the twelve tones below the black tone-location mark indicated by the first and second black tone-location marks  .

Figure 6:
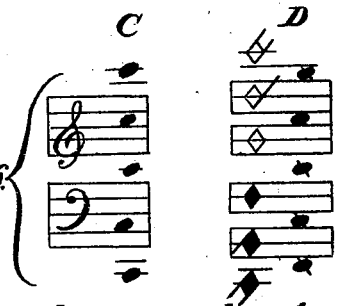
Figure 7:

Fig. 6 of the drawings represents the difference in the arrangement and signs of the same notes in the present method and in my improved method, the letter C designating the present system of notation and the letter D my improved system of notation, from which it will be seen that in my system in the writing of simple pieces of music three staff-lines only are employed and two forms of notes only used, which differ from each other merely in crossing some of the notes.

The advantages of my system of musical notation are as follows:

First. In said system there are three staff-lines only used in simple pieces of music, and the notes themselves indicate the tune without the aid of sharp, flat, and natural signs. Besides, each note has a distinguishing appearance and always the same name, which remains unchangeable.

Second. The notes are easier to discern by reason of the fact that but three staff-lines and notes of two different forms are employed, and the same notes have in all positions the same locations in and upon the lines, the same shape, and the same name.

Third. The half-tone steps are indicated by an immediate succession of crossed-line notes and uncrossed-line notes and also by inverted succession, and the whole-tone steps are indicated by immediate succession of either crossed notes or uncrossed notes, as clearly illustrated, respectively, by the views E and F, (shown in Fig. 7,) whereby simplicity is insured.

Having thus fully described my invention, what I claim as new, and desire to secure by Letters Patent, is—

An improvement in musical notation consisting of a staff of three lines, signs or signatures called tone-location marks, and two distinctive signs for the notes of the scale, which are determined by the position of said signs upon the three-lined staff, substantially as described.

In testimony whereof I have hereunto set my hand in presence of two subscribing witnesses.

JOHANN PETER H. ADAMS.

Witnesses:
  F. L. BREEN,
  E. J. HEIMBACH.